(12) United States Patent
Wallters et al.

(10) Patent No.: US 12,135,867 B2
(45) Date of Patent: Nov. 5, 2024

(54) METHODS AND SYSTEMS FOR PRESENTING DIRECTION-SPECIFIC MEDIA ASSETS

(71) Applicant: Rovi Guides, Inc., San Jose, CA (US)

(72) Inventors: Claire M. Wallters, Saratoga, CA (US); Barbara F. Skliba, Mountain View, CA (US); Robin M. Ford, Los Angeles, CA (US); Sally T. Cook, San Jose, CA (US); Walter R. Klappert, North Hollywood, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/968,612

(22) Filed: Oct. 18, 2022

(65) Prior Publication Data

US 2023/0069452 A1   Mar. 2, 2023

Related U.S. Application Data

(63) Continuation of application No. 16/233,388, filed on Dec. 27, 2018, now Pat. No. 11,507,258, which is a continuation of application No. 14/027,991, filed on Sep. 16, 2013, now Pat. No. 10,168,871.

(51) Int. Cl.
G06F 3/04842   (2022.01)

(52) U.S. Cl.
CPC ............... *G06F 3/04842* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,246,412 B1* | 6/2001 | Shum | G06T 15/10 |
| | | | 382/154 |
| 6,388,714 B1 | 5/2002 | Schein et al. | |
| 6,564,378 B1 | 5/2003 | Satterfield et al. | |
| 6,756,997 B1 | 6/2004 | Ward et al. | |
| 7,165,098 B1 | 1/2007 | Boyer et al. | |
| 7,761,892 B2 | 7/2010 | Ellis et al. | |
| 7,990,394 B2* | 8/2011 | Vincent | G06T 19/20 |
| | | | 700/208 |
| 8,046,801 B2 | 10/2011 | Ellis et al. | |
| 8,965,057 B2* | 2/2015 | Arth | G06T 7/74 |
| | | | 382/107 |
| 8,995,716 B1 | 3/2015 | Zomet et al. | |
| 9,268,406 B2 | 2/2016 | Geisner et al. | |
| 9,280,258 B1* | 3/2016 | Bailly | G06F 16/29 |
| 9,286,624 B2* | 3/2016 | Chau | G06T 11/00 |
| 9,894,115 B2 | 2/2018 | Kim et al. | |

(Continued)

*Primary Examiner* — Haimei Jiang
(74) *Attorney, Agent, or Firm* — HALEY GUILIANO LLP

(57) ABSTRACT

Methods and systems are described herein for a media guidance application that coordinates the display of direction-specific media assets on a display device associated with a particular direction. For example, the media guidance application may receive data (e.g., stored when an image or video was created) that indicates a direction a content capture device was facing when the image or video was captured. Based on that data, the media guidance application may select a particular display device (e.g., a computer, tablet, television, etc.) that corresponds to the direction (e.g., from the point of view of a user) on which to present the media asset.

20 Claims, 7 Drawing Sheets

(56) References Cited

U.S. PATENT DOCUMENTS

| | | | |
|---|---|---|---|
| 10,269,179 B2* | 4/2019 | Fein | G06T 11/60 |
| 10,535,153 B2* | 1/2020 | Weising | G09G 5/08 |
| 2002/0075282 A1* | 6/2002 | Vetterli | G06V 20/20 |
| | | | 345/632 |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2007/0126863 A1* | 6/2007 | Prechtl | H04N 13/344 |
| | | | 348/43 |
| 2008/0028341 A1* | 1/2008 | Szeliski | G06F 3/04815 |
| | | | 715/205 |
| 2009/0243824 A1* | 10/2009 | Peterson | G06F 3/04886 |
| | | | 348/148 |
| 2010/0020254 A1* | 1/2010 | Geng | G03B 21/006 |
| | | | 353/7 |
| 2010/0123737 A1 | 5/2010 | Williamson et al. | |
| 2010/0153885 A1 | 6/2010 | Yates | |
| 2010/0245573 A1 | 9/2010 | Gomi et al. | |
| 2011/0173565 A1* | 7/2011 | Ofek | G09B 29/00 |
| | | | 715/781 |
| 2011/0216060 A1* | 9/2011 | Weising | A63F 13/00 |
| | | | 345/419 |
| 2011/0249024 A1* | 10/2011 | Arrasvuori | G06F 3/017 |
| | | | 715/863 |
| 2012/0179983 A1* | 7/2012 | Lemire | G06F 16/9577 |
| | | | 715/757 |
| 2012/0206319 A1* | 8/2012 | Lucero | H04N 21/41407 |
| | | | 345/1.3 |
| 2013/0007807 A1 | 1/2013 | Grenville et al. | |
| 2013/0007809 A1 | 1/2013 | Hays | |
| 2013/0322845 A1* | 12/2013 | Suzuki | G06F 3/04815 |
| | | | 386/230 |
| 2013/0342629 A1* | 12/2013 | North | H04N 21/44008 |
| | | | 348/E7.078 |
| 2014/0032635 A1 | 1/2014 | Pimmel et al. | |
| 2014/0268064 A1* | 9/2014 | Kahle | G01S 17/875 |
| | | | 353/28 |
| 2014/0270692 A1* | 9/2014 | Suzuki | H04N 23/698 |
| | | | 386/230 |
| 2014/0282103 A1* | 9/2014 | Crandall | G09G 5/12 |
| | | | 715/753 |
| 2014/0300775 A1* | 10/2014 | Fan | H04N 1/32128 |
| | | | 348/222.1 |
| 2014/0302773 A1 | 10/2014 | Jantunen et al. | |
| 2014/0320389 A1* | 10/2014 | Scavezze | G02B 27/0172 |
| | | | 345/156 |
| 2015/0109407 A1* | 4/2015 | Giger | G01S 17/86 |
| | | | 348/36 |
| 2015/0109446 A1* | 4/2015 | Takano | B60R 25/10 |
| | | | 348/148 |
| 2015/0130894 A1* | 5/2015 | Holzer | G06F 3/04842 |
| | | | 348/36 |
| 2015/0156416 A1* | 6/2015 | Filip | H04N 23/698 |
| | | | 348/36 |
| 2016/0005229 A1* | 1/2016 | Lee | G06T 11/60 |
| | | | 345/419 |
| 2017/0084051 A1* | 3/2017 | Weising | G06T 7/20 |

* cited by examiner

METHODS AND SYSTEMS FOR PRESENTING DIRECTION-SPECIFIC MEDIA ASSETS

CROSS-REFERENCE TO RELATED APPLICATIONS

This application is a continuation of U.S. patent application Ser. No. 16/233,388, filed Dec. 27, 2018, which is a continuation of U.S. patent application Ser. No. 14/027,991, filed Sep. 16, 2013, (now U.S. Pat. No. 10,168,871), the disclosures of each application are incorporated by reference in their entireties.

BACKGROUND

As content capture devices (e.g., cameras) are increasingly incorporated into other types of mobile devices (e.g., smartphones, tablets, etc.), the frequency at which users capture images and/or videos also increases. Furthermore, as users acquire more and more images and/or videos, users increasingly obtain display devices capable of presenting the images and/or videos. As the number of display devices and the number of images and/or videos for display on those display devices presents an exponential amount of combinations, users may need guidance for how to arrange and/or present the media assets.

SUMMARY

Accordingly, methods and systems are described herein for a media guidance application that coordinates the display of direction-specific media assets on a display device associated with a particular direction. For example, the media guidance application may receive data (e.g., stored when an image or video was created) that indicates a direction a content capture device was facing when the image or video was captured. Based on that data, the media guidance application may select a particular display device (e.g., a computer, tablet, television, etc.) that corresponds to the direction (e.g., from the point of view of a user) on which to present the media asset. By selecting a display device corresponding to the direction the content capture device was facing, the media guidance application may recreate environments, scenes, nostalgic moments, etc. for the enjoyment of the user.

For example, while on vacation, a user may capture multiple images or a panoramic image from a particular location. Upon returning home, the user may wish to recreate the location through presentation of the captured images. Accordingly, a media guidance application may select particular images to appear on a particular display device based on whether or not the selected image is associated with the same direction (e.g., north, south, east, west, etc.) as the display device from the viewpoint of the user. For example, if a user captured an image of a landmark that was directly north of the user at a first location (e.g., the site of the vacation), the media guidance application may select a display device (e.g., a television) for presenting the image if the display device is directly north (e.g., as determined based on a user setting) of the user at the second location (e.g., the home of a user).

In some aspects, the media guidance application may receive a first media asset, captured by a content capture device, associated with a first location. The media guidance application may then determine a first direction that the content capture device faced when capturing the first media asset at the first location. The media guidance application may also receive a user input requesting to generate a display of media assets associated with the first location at a second location and detect a first display device associated with a first direction at the second location. The media guidance application may then generate a display of the first media asset on the first display device in response to determining that the first direction at the first location corresponds to the first direction at the second location.

In some aspects, the media guidance application may also determine a second direction that the content capture device faced when capturing a second media asset at the first location, and in response to the user input, detect a second display device associated with a second direction at the second location. The media guidance application may then generate a display of the second media asset on the second display device, simultaneously with the display of the first media asset on the first display device, in response to determining that the second direction at the first location corresponds to a second direction at the second location. For example, the media guidance application may direct multiple user devices (e.g., corresponding to different direction from the viewpoint of the user) to present multiple media assets corresponding to different directions. Accordingly, the media guidance application may employ multiple media assets to replicate a prior location.

In some aspects, the media guidance application may receive data associated with the first media asset, in which the data indicates that the content capture device faced the first direction when capturing the first media asset at the first location. The direction may correspond to a frame of reference that is stationary relative to Earth's magnetic poles (e.g., aligned to point to Earth's magnetic poles).

In some aspects, the media guidance application may incorporate and/or access an accelerometer in order to differentiate directions. For example, a user device incorporating a display screen and upon which the media guidance application is implemented may receive directional information as the user device changes direction. In response to detecting that the user device is changing directions, the media guidance application may modify media assets on the user device to correspond to the current direction.

In some aspects, the media guidance application may also select media assets for presentation based on a first time at which the content capture device captured the first media asset at the first location. For example, the media guidance application may select media assets for presentation in response to determining that the media asset was captured at a time, date, season, etc. corresponding to the current time, date, season, etc.

In some aspects, the media guidance application may present one or more frames (e.g., corresponding to a particular direction) of a video (e.g., including frames corresponding to multiple directions). For example, the media guidance application may determine a direction that the content capture device faced when capturing each frame of the first media asset. The media guidance application may then select only frames associated with a direction that corresponds to a particular display device for presentation on that display device.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
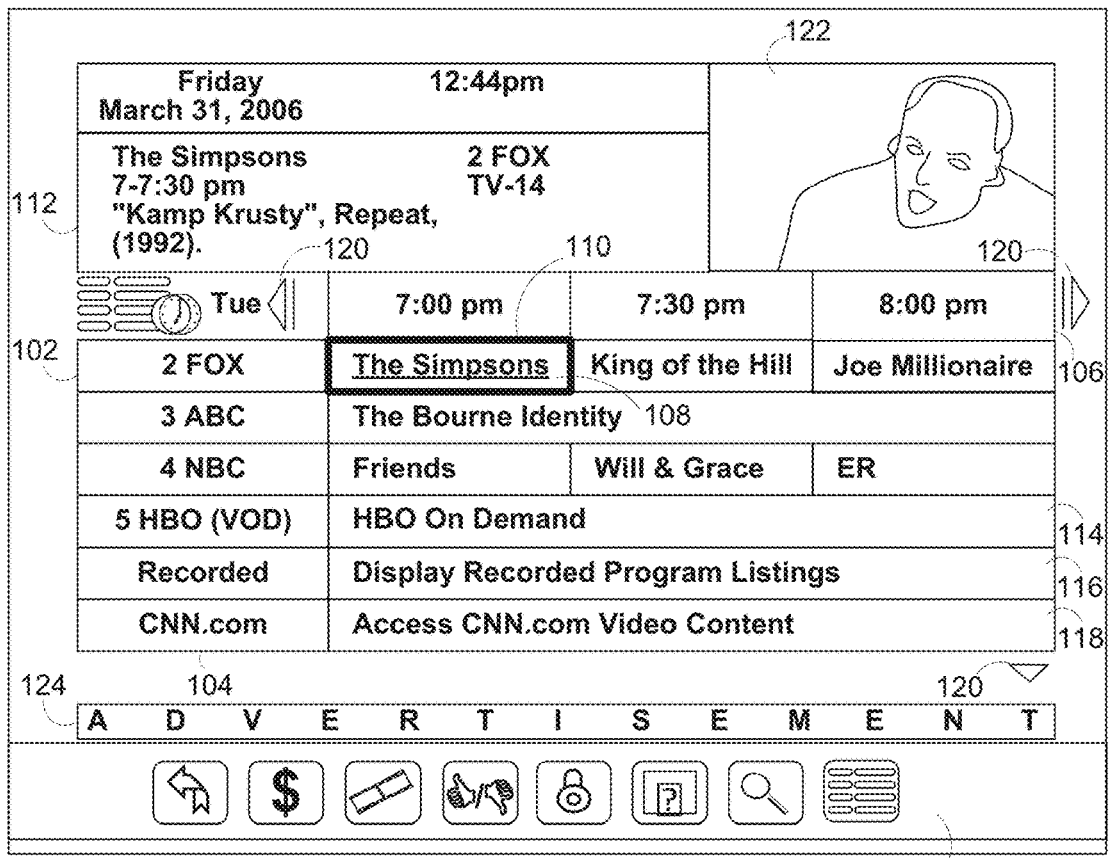
FIG. 1 shows an illustrative media guidance application for presenting media assets in accordance with some embodiments of the disclosure.

Methods and systems are described herein for a media guidance application that coordinates the display of direction-specific media assets on a display device associated with a particular direction. For example, the media guidance application may receive data (e.g., stored when an image or video was created) that indicates a direction a content capture device was facing when the image or video was captured. Based on that data, the media guidance application may select a particular display device (e.g., a computer, tablet, television, etc.) that corresponds to the direction (e.g., from the point of view of a user) on which to present the media asset. By selecting a display device corresponding to the direction the content capture device was facing, the media guidance application may recreate environments, scenes, nostalgic moments, etc. for the enjoyment of the user.

As referred to herein, a "media guidance application" refers to an application that allows users to efficiently navigate content selections and easily identify and present content that they may desire. In some cases, a media guidance application may also be referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, media assets and display devices may be associated with a direction. As referred to herein a "direction," as associated with a media asset, refers to a deviation, expressed as an angle, from the course of an imaginary line connecting the current position of a user to true or magnetic north to a course a content capture device was facing when a media asset was captured. For example, if a camera was pointed "North" when the camera captured a picture, the direction associated with the picture would be "North." Likewise, if a video camera was facing "South" when a frame of a video was captured, the frame of the video would be associated with a direction of "South."

As referred to herein a "direction," as associated with a display device, refers to a deviation, expressed as an angle, from the course of an imaginary line connecting the current position of a user to true or magnetic north to a course a display device is facing when presenting a media asset to a user and the user. For example, if a television is facing the user and is directly "North" of the user when presenting a media asset on-screen, the direction associated with the television would be "North." In another example, if a tablet is facing the user and is directly "South" of the user, the tablet would be associated with a direction of "South."

It should be noted that a direction associated with a display device may vary depending on the current position and way (e.g., with respect to a user) that a display device is facing. For example, a display device initially located directly "North" of a user may initially be associated with a direction of "North." The direction associated with the display device may change if the position of the display device and the way that the display device faces are changed. For example, if the display device is to move to a position directly "South" of the user, while the display device still faces the user, the display device may now be associated with a direction of "South."

It should be noted that a direction may also be expressed in any other suitable format. For example, additionally or alternatively, a direction may be expressed as a degree (e.g., in a polar coordinate system). In another example, a direction may be expressed as any one of three angles that a line in space makes with the three positive directions (e.g., from a reference point) of coordinate axes (e.g., usually designated as $\alpha$, $\beta$, and $\gamma$ with respect to the x-, y-, and z-axes). For example, in some embodiments "directions" associated with media assets and/or display device may be associated with coordinates relative to a user and/or one or more fixed points.

For example, while atop the Empire State Building, a user may capture panoramic media assets. In addition, the user may capture media assets in directions other than standard compass bearings (e.g., "North," "Southwest," etc.). For example, a user may capture an image looking directly down from the top of the building or at any other angle. In some embodiments, the media guidance application may process these media assets such that a display device (e.g., facing directly up towards the ceiling, sky, etc.) presents corresponding media assets (e.g., media assets captured while a content capture device was facing directly down towards the ground, floor, etc.).

It should be noted that, in some embodiments, the media guidance application may determine the position of a display device and whether or not a display device faces a user. For example, the device upon which the media guidance application is implemented may incorporate and/or have access to a Global Positioning System ("GPS") module or component for determining the position of a user, a display device, and/or content capture device as well as the way the user, display device, and/or content capture device faces. For example, an accelerometer, compass, gyroscope, etc. incorporated into a display device may indicate the current direction that a display faces. Additionally or alternatively, the media guidance application may incorporate and/or have access to one or more devices or modules capable of detecting motion and/or sensing orientation.

For example, in order to determine a position of a user, a display device, and/or content capture device, the media guidance application may receive data describing (e.g., providing coordinates of) the position of the user. In order to determine the way the user, display device, and/or content capture device faces, the media guidance application may receive data describing the position (e.g., providing coordinates of) a first point associated with one side of the user, display device, and/or content capture device (e.g., the side featuring the eyes of a user, display screen, etc.) and compare that position to a second point associated with the other side of the user (e.g., the side featuring the back of the head of a user, side opposite the display screen, etc.). In some embodiments, the data describing the position and/or direction may be stored with the media asset and/or may be stored remotely from the media asset (e.g., in a look-up table database associated with positions and directions of media assets).

Alternatively or additionally, the media guidance application may also receive a user setting indicating a position of a user, a display device, and/or content capture device as well as the way the user, display device, and/or content capture device faces. For example, the media guidance application may generate an interface into which a user may enter information necessary for presenting direction-specific media assets.

Based on these and other suitable methods, the media guidance application may also identify display devices that are within a particular proximity to a user (e.g., a user's room or household, line of sight, etc.). For example, in response to a single user request to generate direction-specific media assets, the media guidance application may automatically determine one or more display devices upon which to generate a display of media assets. For example, in response to a single request, the media guidance application may generate for display direction-specific media assets on all display devices connected to a home network associated with the user.

The media guidance application may also determine which devices within the proximity face the user. For example, even though two devices are within a particular proximity, if only one of the devices faces the user (e.g., indicative of the user being able to view media assets presented on the device), the media guidance application may only generate a display of a media asset on the device facing the user. For example, a user may request that the media guidance application generate a display of media assets associated with a view from a first location (e.g., atop the Eiffel Tower) at a second location (e.g., a user's bedroom). The media guidance application may locate several display devices on the home network of the user not facing the user (e.g., devices in the living room, kitchen, etc.), but because the display devices do not face a user (e.g., within a particular threshold), the media guidance application may not generate a display of media assets on those devices.

In some embodiments, the media guidance application may also present audio or other types of media assets as well. For example, a content capture device may capture sounds, smells, etc. associated with a first location and re-create those sounds, smells, etc. at the second location. For example, the media guidance application may recreate a particular location and supplement video and/or images displayed with sounds and smells associated with the location.

Additionally or alternatively, the media guidance application may obtain media assets that are not created by the user (e.g., created using a content capture device associated with the user). For example, the media guidance application may search for available media assets on one or more remote or local databases. For example, the media guidance application may retrieve third party media assets (e.g., user-generated content such as images posted by another user to a social network of a user) associated with a particular location.

The media guidance application may also identify the location and/or directions associated with third party media assets. In some embodiments, the media guidance application (or the user device upon which the media guidance application is implemented) may include and/or have access to one or more object-recognition modules. An object-recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to identify a direction associated with a media asset. For example, the media guidance application may receive a media asset in the form of a video (e.g., an audio/video recording of a user). The video may include a series of frames. For each frame of the video, the media guidance application may use an object-recognition module to identify objects in the frame as well as the direction a content capture device was facing when the video was taken.

In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text in order to identify objects and/or directions associated with the objects.

In addition, the media guidance application may use multiple types of optical character recognition and/or fuzzy logic; for example, when analyzing subtitles (e.g., in order to determine the content of the media asset) or comparing multiple data fields (e.g., as contained in databases described herein). Using fuzzy logic, the system may determine two fields and/or values to be identical even though the substance of the data field or value (e.g., two different spellings) is not identical. In some embodiments, the system may analyze particular data fields of a database for particular values or text. Furthermore, the data fields could contain values (e.g., the data fields could be expressed in binary or any other suitable code or programming language) other than human-readable text.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens.

In some embodiments, the user equipment device may have a front facing camera and/or a rear facing camera. Additionally or alternatively, any of the user devices described herein may include a display (e.g., for presenting direction-specific media assets) and a content capture device (e.g., for creating direction-specific media assets). For example, content capture devices, such as camcorders, digital cameras with video mode, audio recorders, mobile phones, and handheld computing devices, may be incorporated into and/or accessible by any of the user devices described herein.

On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
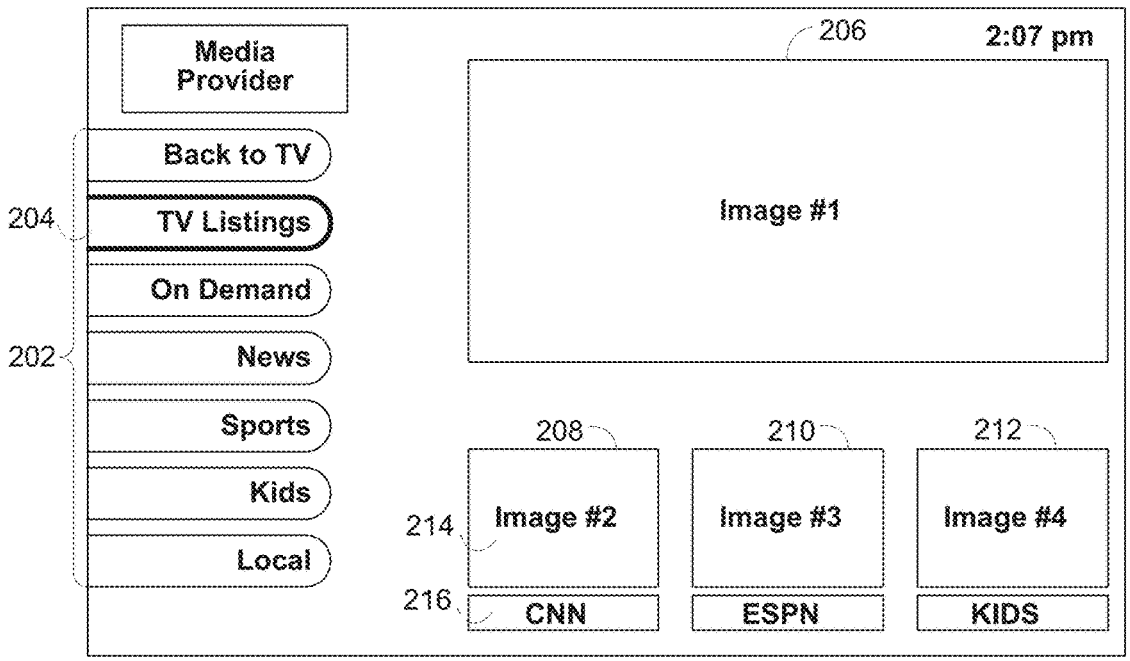
FIG. 2 shows another illustrative media guidance application for presenting media assets in accordance with some embodiments of the disclosure.

FIGS. 1-2 show illustrative display screens that may be used to provide media guidance data. The display screens shown in FIGS. 1-2 and 6-7 may be implemented on any suitable user equipment device or platform. While the displays of FIGS. 1-2 and 6-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
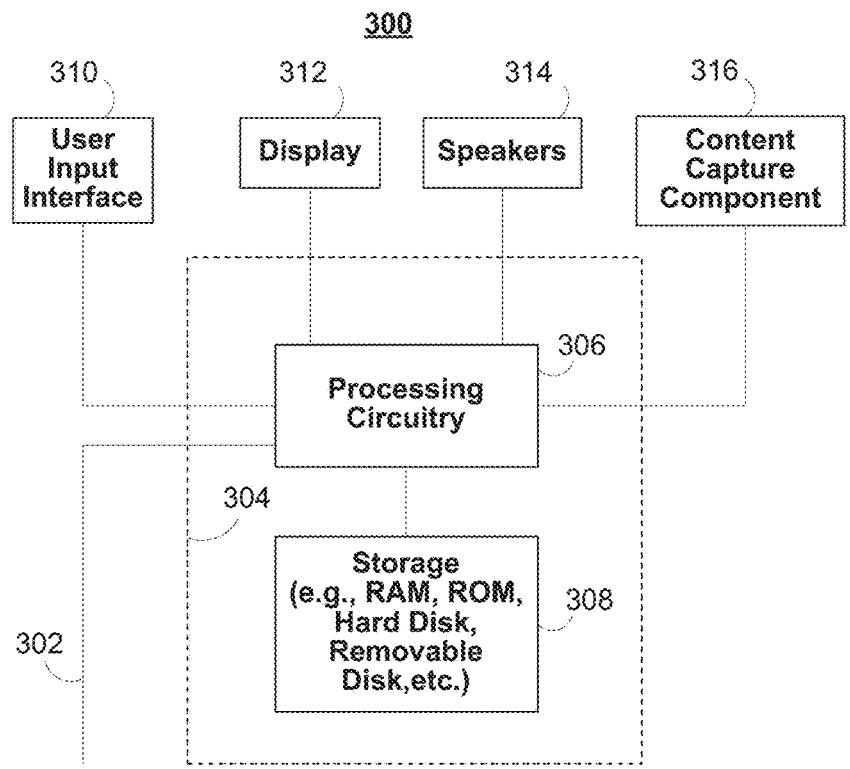
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User device 300 may also include content capture component 316. Content capture component 316 may be any device suitable for creating and/or generating media assets. For example, content capture component 316 may be a camcorder, digital camera, audio recorder, mobile phone, and handheld computing device, or any other device capable of recording and/or storing data.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
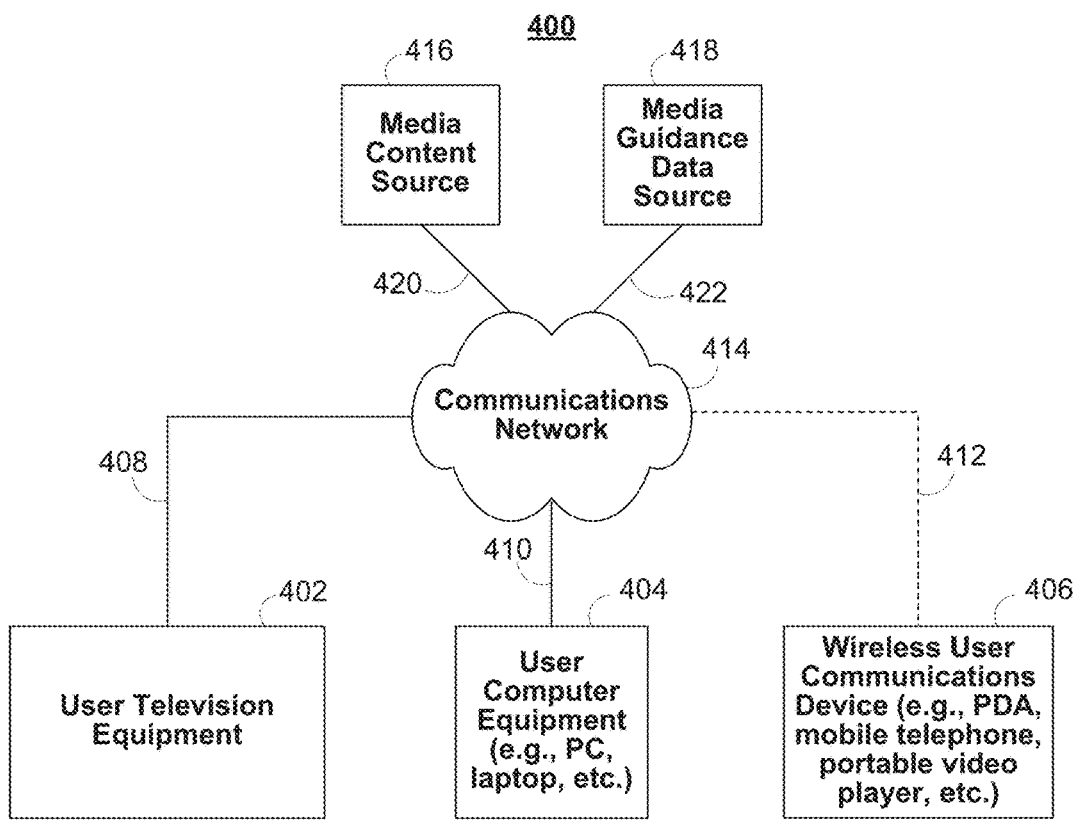
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
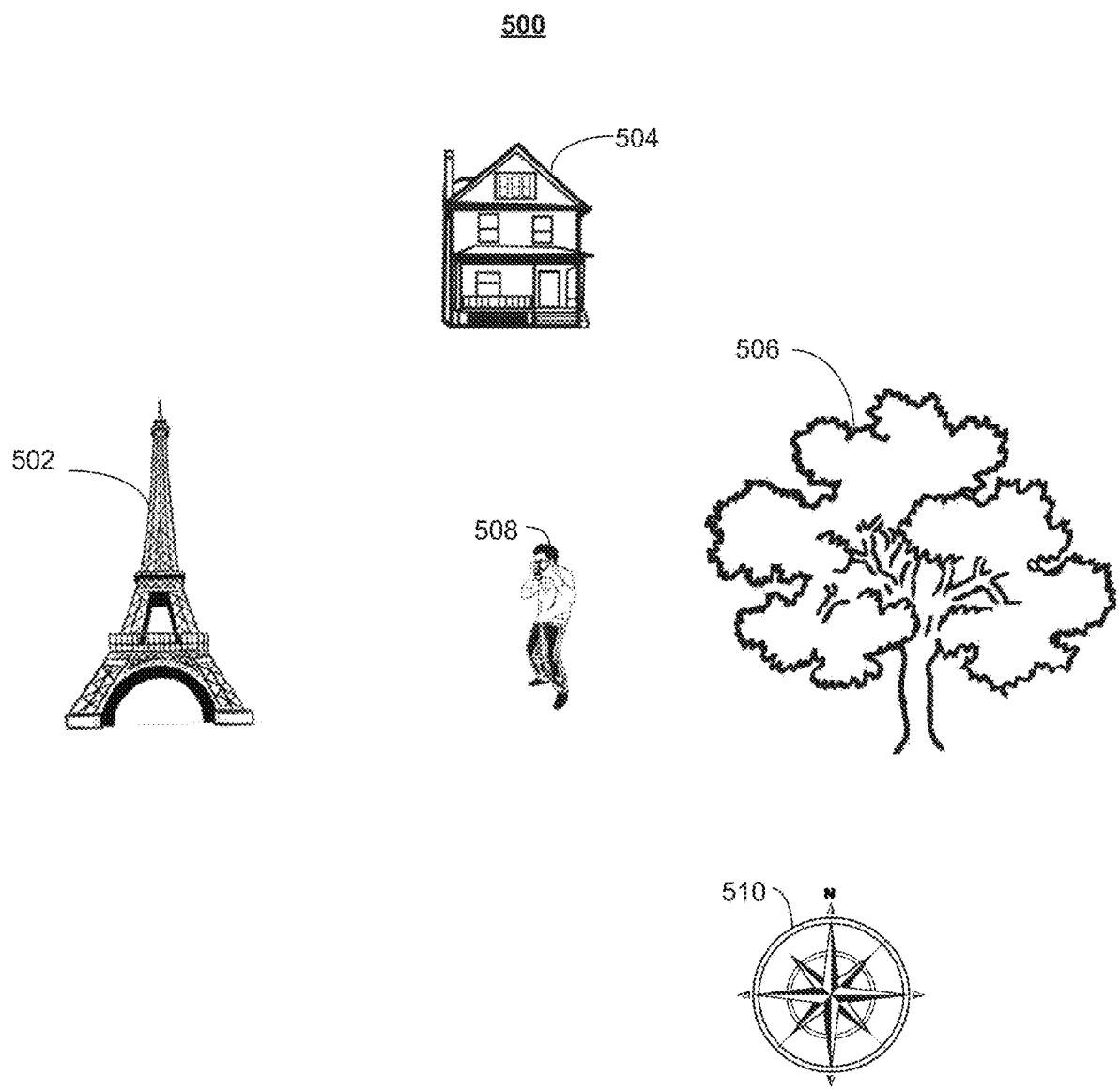
FIG. 5 is an illustrative representation of a user capturing images of various objects associated with different directions at a first location in accordance with some embodiments of the disclosure.

FIG. 5 is an illustrative representation of a user capturing images of various objects associated with different directions at a first location. FIG. 5 shows a representation of a first location (e.g., location 500). In FIG. 5, user 508 is currently capturing images of object 502, object 504, and object 506. As indicated by compass 510, object 502, object 504, and object 506 are each associated with a different direction (e.g., "East," "North," and "West," respectively).

In some embodiments, as a user captures images, videos, audio and/or textual data (e.g., via content capture component 316 (FIG. 3)), the media guidance application stores a compass bearing and/or other directional data associated with each of object 502, object 504, and object 506. For example, a GPS component, accelerometer, compass, gyroscope, etc. incorporated into the content capture device may indicate the direction that the content capture device faced, when the content capture device recorded the media asset.

In some embodiments, the media guidance application may additionally record other "additional data" associated with the media asset. As referred to herein, "additional data" refers to any data that describes characteristics of and/or circumstances surrounding the creation (e.g., via content capture component 316 (FIG. 3)) of a media asset. For example, additional data may describe the time of day, the date, the season (e.g., winter, spring, etc.), the content of the media assets (e.g., names of objects in the media asset, descriptions of the content of the media asset, etc.). For example, the media guidance application may record the time that a particular media asset was captured. Later, when the media guidance application generates a display of direction-specific media assets, the media guidance application may also generate a display of time-specific media assets (i.e., media assets that were captured/generated/recorded at a time corresponding to the current time).

For example, a media guidance application may receive a user request to generate at a second location direction-specific media assets that are associated with a first location and are also associated with a particular time. For example, a user (e.g., via user input interface 310 (FIG. 3)) may request the media guidance application generate a display of media assets corresponding to Miami Beach at dawn on New Years' Day.

In some embodiments, the media guidance application stores the directional data and/or additional data (e.g., as metadata) with the captured media asset. Alternatively or additionally, directional data and/or additional data may be stored in a remote location. The remote location may subsequently be accessed by the media guidance application as necessary in order to generate a display of media assets according to user criteria (e.g., criteria related to the direction, time, etc. of a media asset).

Figure 6:
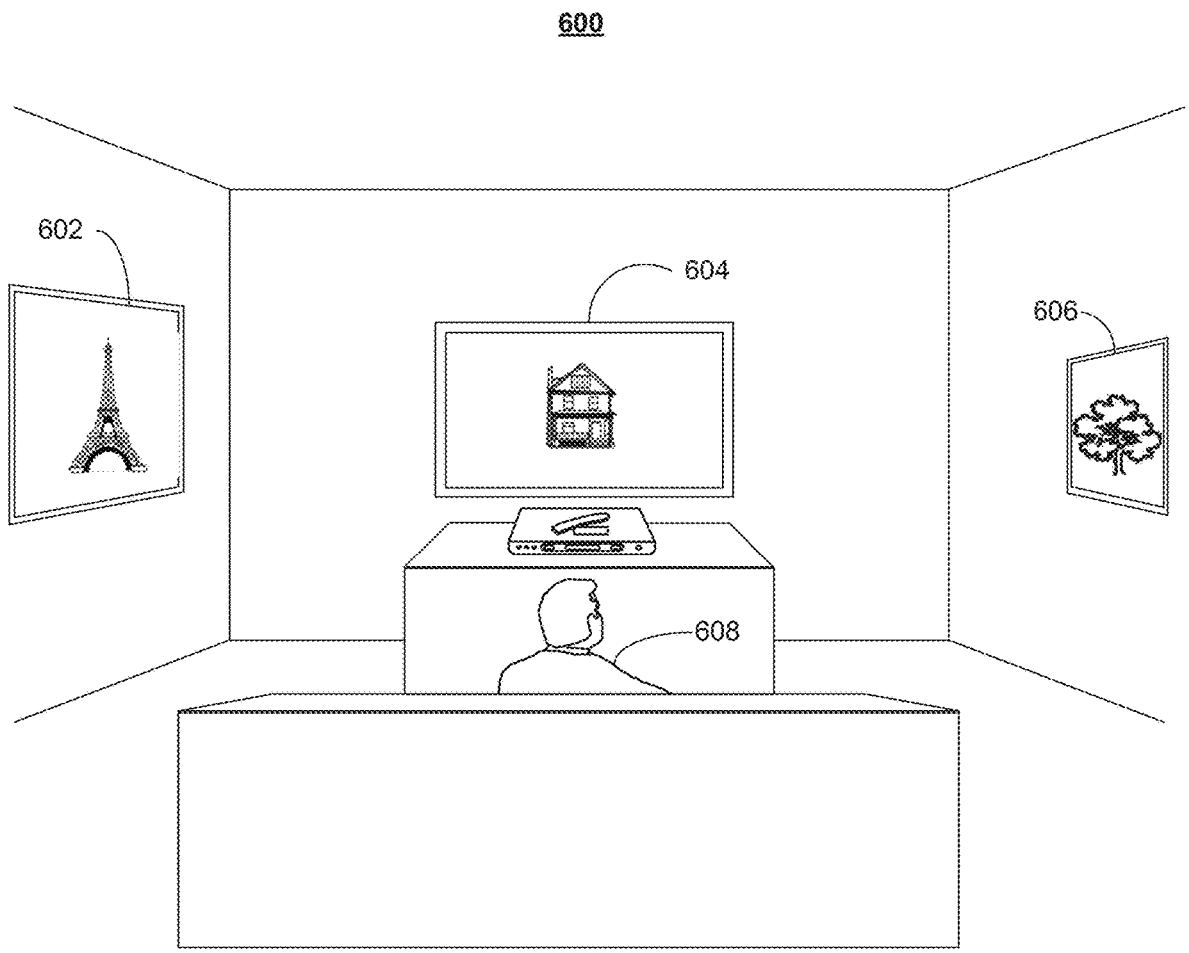
FIG. 6 is an illustrative representation of a presentation of images of various objects associated with different directions at a first location as displayed on display devices associated with the different directions at a second location in accordance with some embodiments of the disclosure.

FIG. 6 is an illustrative representation of a presentation of images of various objects associated with different directions at a first location as displayed on display devices associated with the different directions at a second location. FIG. 6 shows a representation of a second location (e.g., location 600). Location 600 includes multiple display devices. For example, location 600 includes device 602, device 604, and device 606, any of which may, in some embodiments, correspond to user equipment devices 402, 404, and/or 406 (FIG. 4).

Each of device 602, device 604, and device 606 are associated with a different direction respective to user 608. For example, device 602 is associated with "East," device 604 is associated with "North," and device 606 is associated with "West." Furthermore, each of device 602, device 604, and device 606 is currently displaying a direction-specific media asset.

For example, in response to a user request, the media guidance application has populated the display screens of each of device 602, device 604, and device 606 with a media asset associated with the same direction at a different location. For example, device 602 is presenting a media asset of object 502 (FIG. 5) as both device 602 and object 502 (FIG. 5) are associated with a direction of "East." Device 604 is presenting a media asset of object 504 (FIG. 5) as both device 604 and object 504 (FIG. 5) are associated with a direction of "North." Finally, device 606 is presenting a media asset of object 506 (FIG. 5) as both device 606 and object 506 (FIG. 5) and are associated with a direction of "East."

As shown in FIG. 6, the media guidance application has directed (e.g., via control circuitry 304 (FIG. 3)), media assets from a first location (e.g., location 500 (FIG. 5)) to be presented at a second location (e.g., location 600), in which the media assets (e.g., of object 502, object 504, and object 506 (FIG. 5)) corresponding to the directions associated with user devices (e.g., device 602, device 604, and device 606 (FIG. 6)). Accordingly, the environment of location 500 (FIG. 5) has been recreated at a different location (e.g., location 600).

Additionally or alternatively, the media guidance application may generate additional sounds, smells, etc. associated with the first location (e.g., location 500 (FIG. 5)). The media guidance application may also recommend products or content (e.g., food, clothing, etc.) associated with the first location (e.g., location 500 (FIG. 5)) while the user is at the second location (e.g., location 600).

Additionally or alternatively, the media guidance application may modify the media assets presented on device 602, device 604, and/or device 606 based on additional data associated with the media assets. For example, as the time of day changes (e.g., as nightfall approaches), the media guidance application may generate a display of media assets corresponding to object 502, object 504, and object 506 (FIG. 5) at night (e.g., either adjusted for time zone differences or not).

In some embodiments, the media guidance application may have presented direction-specific media assets on device 602, device 604, and/or device 606 in response to determining that device 602, device 604, and/or device 606 where with a particular proximity as discussed above. Alternatively, the media guidance application may have received one or more user inputs (e.g., via user input interface 310 (FIG. 3)) selecting each of device 602, device 604, and/or device 606. For example, the media guidance application may receive a user input indicating that a particular room of a house should represent a first location (e.g., location 500 (FIG. 5)), while a different room of a house represents a different location.

In some embodiments, the media guidance application may determine the directions associated with each of device 602, device 604, and/or device 606 via one or more of the methods discussed above. For example, the media guidance application may receive a user input indicating the position and direction of each of device 602, device 604, or device 606. The media guidance application may have, additionally or alternatively, used GPS data associated with a display screen on each of device 602, device 604, or device 606 to determine the direction each of device 602, device 604, or device 606 is facing. The media guidance application may also determine a direction that each of device 602, device 604, or device 606 is facing in response to receiving accelerometer information for each of device 602, device 604, and/or device 606, as discussed below in relation to FIG. 7.

In some embodiments, the media guidance application may also provide other media content associated with a first location currently recreated at a second location. For example, in addition to generating a display of media assets from a particular location, the media guidance application may advertise products or service associated with the particular location. For example, in response to recreating a scene of Rome, Italy, the media guidance application may generate an advertisement for Italian food. In another example, in response to determining that the user is recreating a scene from Paris, France, the media guidance application recommend French movies for presentation on one or more display devices.

The media guidance application may also provide numerous options from viewing media assets associated with a particular location. For example, a user may input (e.g., via user input interface 310 (FIG. 3)) one or more criteria associated with the display of media asset at the second location. For example, in addition to selecting a time and/or place to recreate at the second location, the media guidance application may allow a user to present particular media assets associated with that location and/or choose to not present other media assets associated with that location. For example, the media guidance application may allow a user to manual select or skip media assets that the user may not wish to appear (e.g., duplicate media assets, media assets with poor quality, etc.). Additionally or alternatively, the media guidance application may receive criteria (e.g., filtering available media assets) or other rules governing whether or not a media asset is presented.

Figure 7:
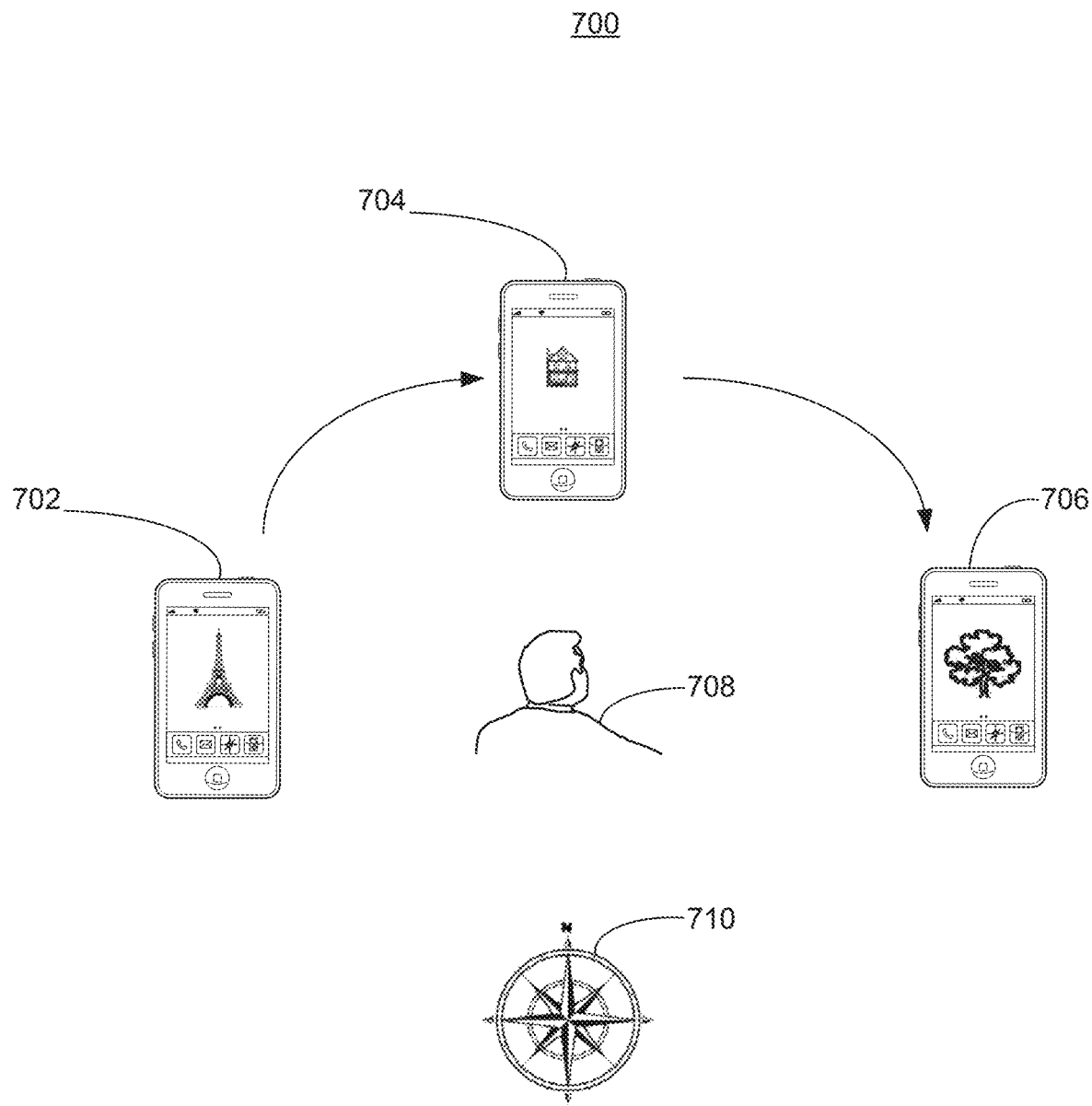
FIG. 7 is an illustrative representation of a presentation of a series of images of various objects associated with different directions at a first location as a display device is associated with different directions at a second location in accordance with some embodiments of the disclosure.

FIG. 7 is an illustrative representation of a presentation of a series of images of various objects associated with different directions at a first location as a display device is associated with different directions at a second location. FIG. 7 shows location 700. In location 700, user 708 is changing the direction associated with his/her user device. For example, in some embodiments, user 708 may move a user device (e.g., user device 300 (FIG. 3)) in a 360-degree motion in order to view a piecemeal representation of a panoramic view of a different location.

For example, FIG. 7 represents user 708 moving a user device (e.g., user device 300 (FIG. 3)) about a first location (e.g., location 700) and viewing a presentation of direction-specific media assets associated with a second location (e.g., location 500 (FIG. 5)). As indicated by compass 710, position 702 is associated with the direction of "East." Position 704 is associated with the direction of "North," and position 706 is associated with a position of "West."

As the user device is moved through the various directions, the media asset present on the user device changes as well to reflect the current direction associated with the user device. For example, as the media guidance application (e.g., via an accelerometer, gyroscope, compass, etc. incorporated into and/or accessible by user device 300 (FIG. 3)) detects that a user is changing the direction associated with the user device, the media guidance application may, in response, generate a display of a media asset associated with the current direction.

For example, at position 702, a user device (e.g., user device 300 (FIG. 3)) is initially associated with a direction of "East." Accordingly, the media guidance application (e.g., via control circuitry 304 (FIG. 3)) has generated a display of a media asset associated with the direction of "East" (e.g., a media asset of object 502 (FIG. 5)). Subsequently, the user device is moved to position 704. At position 704, a user device (e.g., user device 300 (FIG. 3)) is associated with a direction of "North." Accordingly, the media guidance application (e.g., via control circuitry 304 (FIG. 3)) has generated a display of a media asset associated with the direction of "North" (e.g., a media asset of object 504 (FIG. 5)). The user device is then moved to position 706. At position 706, a user device (e.g., user device 300 (FIG. 3)) is associated with a direction of "West." Accordingly, the media guidance application (e.g., via control circuitry 304 (FIG. 3)) has generated a display of a media asset associated with the direction of "West" (e.g., a media asset of object 506 (FIG. 5)).

In some embodiments, the media guidance application may also respond to other directional movements. For example, in response to aiming a use device higher (e.g., towards a ceiling), the media guidance application may generate a display of a media asset corresponding to a higher direction (e.g., a media asset of the sky at location 500 (FIG. 5)).

It should be noted that as the user device is moved from position 702 to position 704, and to position 706, the media guidance application may select frames, each frame associated with a direction, of a video, including frames associated with multiple directions. For example, the media guidance application may determine a direction associated with each frame of the video and select only frames (even if out of sequence) that correspond to a particular direction for display on a display device (e.g., user device 602 (FIG. 6)).

In addition, the media guidance application may generate different frames (e.g., associated with different directions) of a media asset for simultaneous display on different display devices. For example, a single media asset (e.g., a video shot while user 508 (FIG. 5) turns 180 degrees from "East" to "West") may include a frame featuring object 502 (FIG. 5), object 504 (FIG. 5), and object 506 (FIG. 5). In response to determining that there are multiple display devices (e.g., device 602 (FIG. 6), device 604 (FIG. 6), and device 606 (FIG. 6)) in proximity to a user (e.g., user 708), the media guidance application may select frames from the single media asset corresponding to the direction associated with each of the multiple devices and display the frames simultaneously to a user (e.g., as shown in FIG. 6)).

Figure 8:
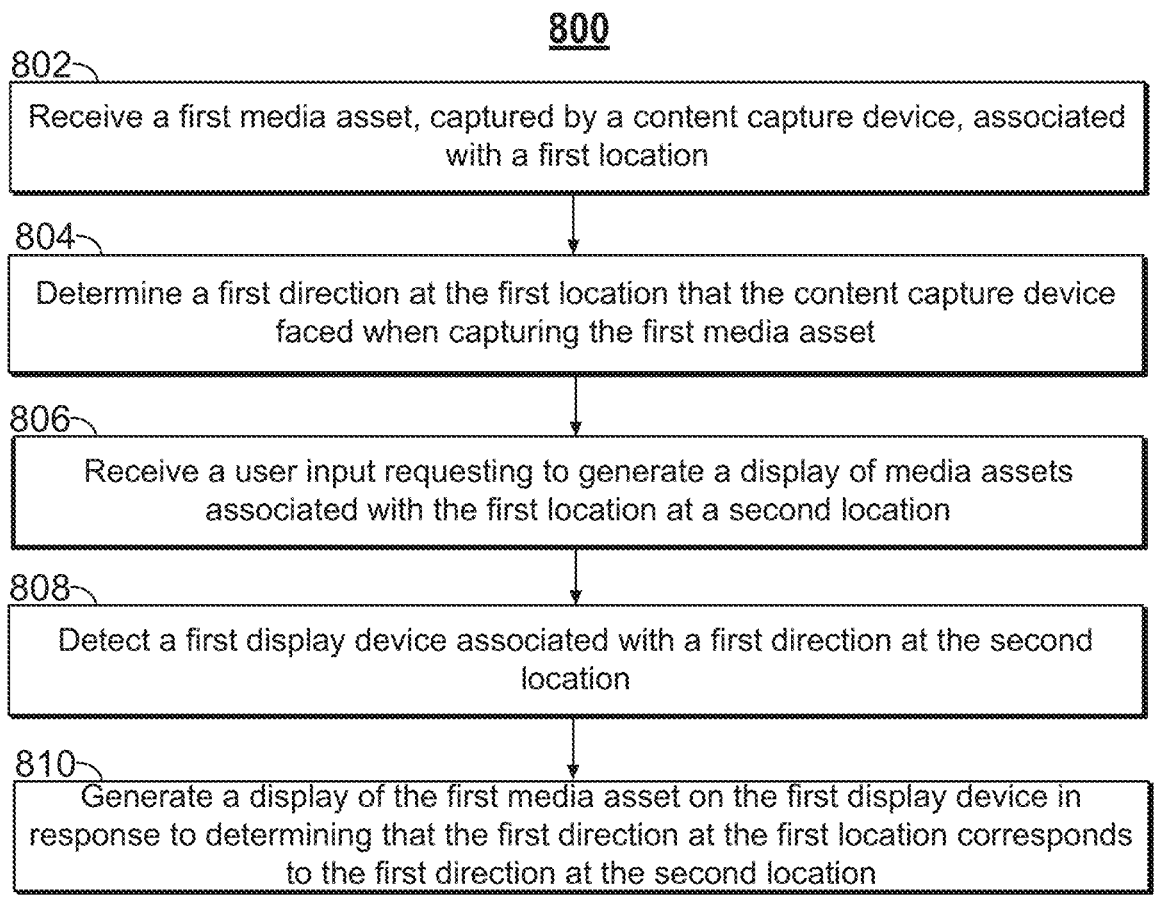
FIG. 8 is a flowchart of illustrative steps involved in generating a display of a direction-specific media asset in accordance with some embodiments of the disclosure.
Figure 9:
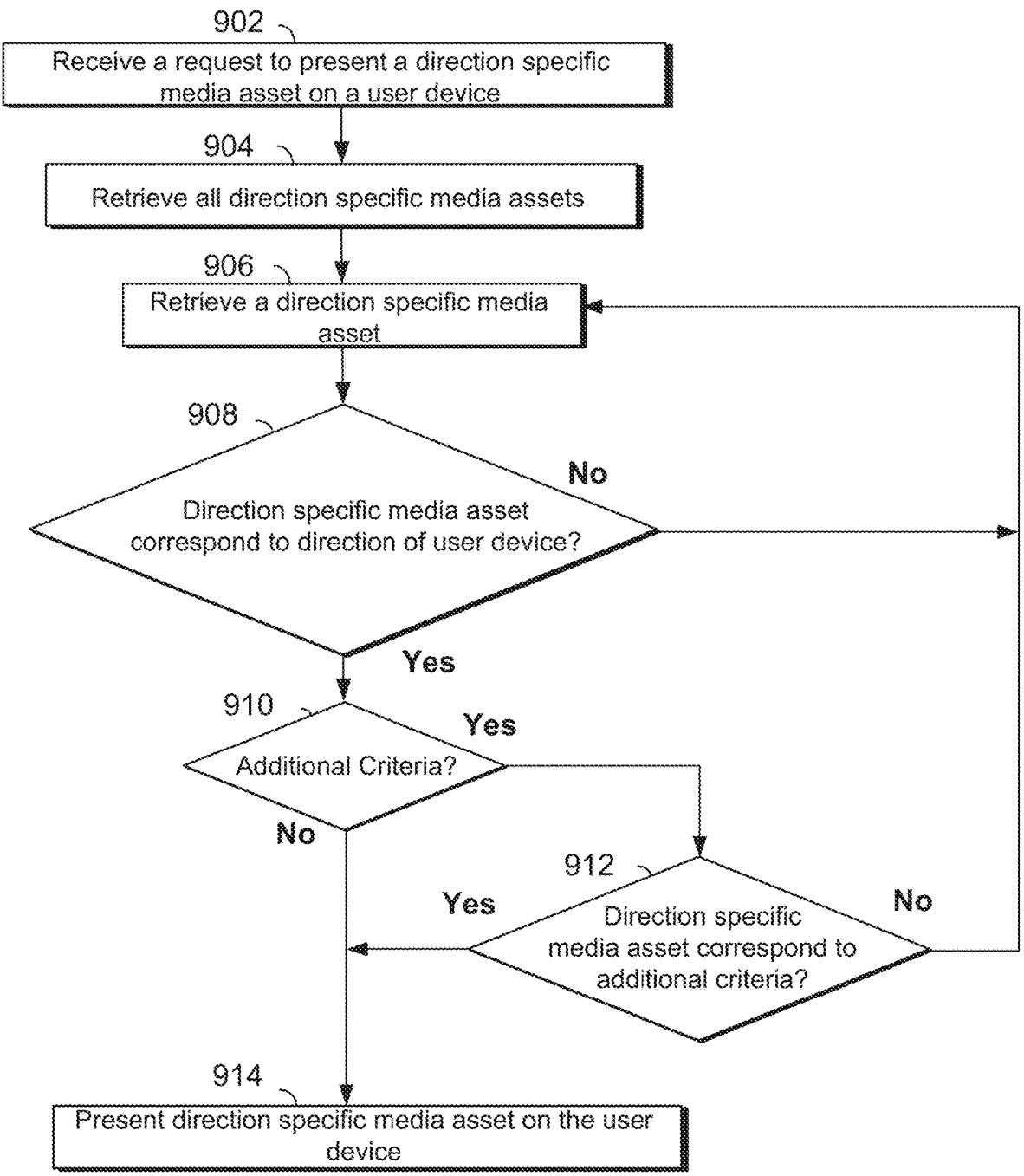
FIG. 9 is a flowchart of illustrative steps involved in generating a display of a media asset based on direction information associated with the specific media asset in accordance with some embodiments of the disclosure.

FIG. 8 is a flowchart of illustrative steps involved in generating a display of a direction-specific media asset. It should be noted that process 800 or any step thereof, could be performed on, or provided by, any of the devices shown in FIGS. 3-4. For example, process 800 may be executed by control circuitry 304 (FIG. 3) as instructed by a media guidance application implemented on user equipment 402, 404, and/or 406 (FIG. 4) in order to produce a display of a direction-specific media asset (e.g., as discussed in relation to FIGS. 5-7) in response to a user request (e.g., received via user input interface 310 (FIG. 3)). In addition, one or more steps of process 800 may be incorporated into or combined with one or more steps of process 900 (FIG. 9).

At step 802, the media guidance application receives a first media asset, captured by a content capture device, associated with a first location. For example, a content capture device (e.g., user device 300 (FIG. 3) incorporating content capture component 316 (FIG. 3)) may capture an image of an object (e.g., object 502 (FIG. 5)).

For example, the media asset may be associated with an object (e.g., object 502 (FIG. 5)) that a user (e.g., user 508 (FIG. 5)) recorded while on a vacation. The media asset may be stored locally (e.g., at storage 308 (FIG. 3)) or may be stored remotely (e.g., at media content source 416 (FIG. 4), media guidance data source 418 (FIG. 4), and/or any device accessible via communications network 414 (FIG. 4)).

At step 804, the media guidance application may determine a first direction at the first location that the content capture device faced when capturing the first media asset. For example, the media guidance application may receive data (e.g., via an internal accelerometer) indicating a direction that the content capture device faced when the media asset was recorded.

In some embodiments, the media guidance application may receive data indicating a direction that the content capture device faced when the media asset was recorded. For example, directional data may be stored with and/or incorporated into the media asset (e.g., as metadata). Additionally or alternatively, data indicating a direction that the content capture device faced when the media asset was recorded with the content capture device may be stored in a database locally (e.g., at storage 308 (FIG. 3)) or remotely (e.g., at media content source 416 (FIG. 4), media guidance data source 418 (FIG. 4), and/or any device accessible via communications network 414 (FIG. 4)).

In such embodiments, the media guidance application may access this database as necessary to generate displays of direction-specific media assets. For example, a database may include all available media assets. For each media asset, the database may include a field that indicates the location a content capture device was when the media asset was recorded, the location of the media asset (e.g., as determine by GPS data), and/or any additional data for the media asset.

At step 806, the media guidance application receives a user input requesting to generate a display of media assets associated with the first location at a second location. For example, the media guidance application may receive (e.g., via user input interface 310 (FIG. 3)) a location, direction, and/or additional data as criteria for media assets the user wishes to be displayed. Alternatively or additionally, the media guidance application may automatically select one or more criterion (e.g., a direction) based on the position of one or more display devices.

For example, after returning from a vacation, a user (e.g., user 608 (FIG. 6)) may wish to recreate the vistas experience on a previous vacation. In response, the user may request the media guidance application generate one or more direction-specific media assets on one or more display devices (e.g., device 602, device 604, and/or device 606 (FIG. 6)) at the current location (e.g., location 600 (FIG. 6)) of the user.

At step 808, the media guidance application detects a first display device associated with a first direction at the second location. For example, the media guidance application may receive (e.g., via I/O path 302 (FIG. 3)) data indicating available display devices for presenting media assets. For example, the media guidance application may receive GPS data, user profile settings, etc. associated with both the position and the way each display device at a location (e.g., a home of the user). Based on this information, the media guidance application (e.g., via control circuitry 304 (FIG. 3)) may request one or more direction-specific media assets that correspond to the direction of the display devices.

For example, the media guidance application may determine at a particular location (e.g., location 600 (FIG. 6)) that there are three display devices (e.g., device 602, device 604, and device 606 (FIG. 6)). Additionally, the media guidance application may determine a direction associated with each of the three devices. In response to determining the direction associated with each of the three display devices, the media guidance application may request (e.g., via control circuitry 304 (FIG. 3)) one or more media assets (e.g., from storage 308 (FIG. 3) and/or media content source 416 (FIG. 4)) corresponding to the request of the user (e.g., to generate media assets from a particular location).

For example, in order to select media assets associated with a user-selected location (e.g., location 500 (FIG. 5)), the media guidance application may cross-reference the user-selected location (e.g., location 500 (FIG. 5) with the database. In response, the database may output all media assets associated with the location.

In addition, for each media asset, the database may include a field that indicates the direction a content capture device faced when the media asset was recorded. In order to select media assets associated with a particular direction (e.g., "North"), the media guidance application may cross-reference a direction (e.g., "North") with the database. In response, the database may output all media assets associated with the direction.

The database may also include, for each media asset, one or more fields that indicate the additional data associated with the media asset. In order to select media assets associated with user-selected additional data (e.g., "7:00 PM"), the media guidance application may cross-reference the user-selected additional data (e.g., "7:00 PM") with the database. In response, the database may output all media assets associated with the user-selected additional data.

At step 808, the media guidance application generates a display of the first media asset on the first display device in response to determining that the first direction at the first location corresponds to the first direction at the second location. For example, in response to determining that a media asset (e.g., a media asset of object 502 (FIG. 5)) corresponds to a first location (e.g., location 500 (FIG. 5)) and a direction (e.g., "East") associated with a display device (e.g., device 602 (FIG. 6)) at a second location (e.g., location 600 (FIG. 6)), the media guidance application (e.g., via control circuitry 304 (FIG. 3)) generates a display of the media asset on the display (e.g., display 312 (FIG. 3)) of a display device (e.g., device 602 (FIG. 6)).

In some embodiments, the media guidance application may also generate a display of direction-specific media assets on a single mosaic display in which the direction associated with each media asset is indicated by the placement of the media asset in the mosaic display. For example, if a media asset is associated with a direction of "North," the media guidance application (e.g., via control circuitry 304 (FIG. 3)) may generate a display (e.g., on display 312 (FIG. 3)) of the media asset at the top of the display screen (e.g., of user equipment device 402, 404, and/or 406 (FIG. 4)). In another example, if a media asset is associated with a direction of "South," the media guidance application (e.g., via control circuitry 304 (FIG. 3)) may generate a display (e.g., on display 312 (FIG. 3)) of the media asset at the bottom of the display screen (e.g., of user equipment device 402, 404, and/or 406 (FIG. 4)).

In some embodiments, the placement of the media asset may also depend on the orientation of the display device upon which the media asset is generated. For example, if a user device (e.g., user device 300 (FIG. 3)) is orientated perpendicular to the plane of the Earth (e.g., hanging on a wall of a room), the media guidance application may generate a display of a media asset that corresponds to the direction of the display device (e.g., as discussed in FIG. 8 above). Alternatively or additionally, if the media guidance application (e.g., via an accelerometer incorporated into and/or accessible by a device upon which the media guidance application is implemented) determines that the device is parallel to the plane of the Earth (e.g., parallel to the floor of a room), the media guidance application may generate a mosaic display of media assets in which media assets associated with the direction of "North" are displayed at the top of a display screen, media assets associated with the direction of "South" are displayed at the bottom of a display screen, etc.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 8.

FIG. 9 is a flowchart of illustrative steps involved in generating a display of a media asset that is based on direction information associated with the specific media asset. It should be noted that process 800 or any step thereof, could be performed on, or provided by, any of the devices shown in FIGS. 3-4. For example, process 900 may be executed by control circuitry 304 (FIG. 3) as instructed by a media guidance application implemented on user equipment 402, 404, and/or 406 (FIG. 4) in order to produce a display of a direction-specific media asset (e.g., as discussed in relation to FIGS. 5-7) in response to a user request (e.g., received via user input interface 310 (FIG. 3)). In addition, one or more steps of process 900 may be incorporated into or combined with one or more steps of process 800 (FIG. 9).

At step 902, the media guidance application receives a request to present a direction-specific media asset on a user device. For example, the media guidance application (e.g., via user input interface 310 (FIG. 3)) receives a request to generate a media asset for display on a display device (e.g., user equipment device 402, 404, and/or 406 (FIG. 4)), in which the content capture device that recorded the media asset is associated with the same direction as the display device. For example, the media guidance application may receive a request to generate a display of a media asset at the current location of a user (e.g., location 600 (FIG. 6)), in which the media asset captured at a second location (e.g., location 500 (FIG. 5)) corresponds to the same direction (e.g., "North") as a display device (e.g., device 604 (FIG. 6)) at the current location of the user (e.g., user 608 (FIG. 6)).

At step 904, the media guidance application retrieves all direction-specific media assets. For example, the media guidance application (e.g., via control circuitry 304 (FIG. 3)) may access one or more databases (e.g., storage 308 (FIG. 3) of a content capture device) and/or third party databases (e.g., media content source 416 (FIG. 4) and/or any other location accessible via communications network 414 (FIG. 4)).

At step 906, the media guidance application retrieves a direction-specific media asset. For example, the media guidance application (e.g., via processing circuitry 306 (FIG. 3)) may process each of the available media assets in order to select a media asset corresponding to the particular criteria of the user. In some embodiments, the media guidance application may perform multiple iterations of process 900. Additionally or alternatively, process 900 may be performed by inputting the criteria of the user into a database (e.g., a look-up table database) and receiving an output of suitable media assets.

At step 908, the media guidance application determines whether or not the direction-specific media assets correspond to the direction of the user device. For example, if the media guidance application determines (e.g., via control circuitry 304 (FIG. 3)), that the available display device (e.g., user equipment device 402, 404, and/or 406 (FIG. 4)) corresponds to a particular direction, the media guidance application may filter through available media assets until a media asset corresponding to the particular direction is found.

If the media guidance application determines (e.g., via processing circuitry 306 (FIG. 3)) that the direction-specific media asset corresponds to the direction of the user device (e.g., user equipment device 402, 404, and/or 406 (FIG. 4)), the media guidance application proceeds to step 910. If the media guidance application determines that the direction-specific media asset does not correspond to the direction of the user device, the media guidance application returns to step 906 and select a different direction-specific media asset.

At step 910, the media guidance application determines whether or not the user requested any additional criteria. For example, the media guidance application may have received (via user input interface 310 (FIG. 3)) instructions to generate a display of media assets that corresponds to the current time at the location of the user (e.g., location 600 (FIG. 6)). In response, the media guidance application may further filter available media asset based on the additional criteria.

If the media guidance application determines that there are additional criteria, the media guidance application proceeds to step 912. If the media guidance application determines that there are no additional criteria, the media guidance application proceeds to step 914. At step 912, the media guidance application determines whether or not the direction-specific media asset corresponds to the additional criteria. For example, the media guidance application may determine (e.g., via processing circuitry 306 (FIG. 3)) whether or not additional data (e.g., indicative of a date on which the media asset was created) corresponds the additional criteria (e.g., requesting that a media asset created on the current date a year prior be displayed).

If the media guidance application determines that the direction-specific media asset does not correspond to the additional criteria, the media guidance application returns to step 906 and retrieves a different direction-specific media asset. If the media guidance application determines that the direction-specific media asset does correspond to the additional criteria, the media guidance application proceeds to step 914.

At step 914, the media guidance application presents a direction-specific media asset on the user device. For example, in response to determining (e.g., via processing circuitry 306 (FIG. 3)) that the direction of a media asset (e.g., a media asset of object 504 (FIG. 5)) corresponds to the direction of a display device (e.g., device 604 (FIG. 6)), the media guidance application generates a display of the media asset on the display device.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method comprising:
   receiving capture of a first image at a first location in the real world by a first capture device, wherein the image is captured when the first capture device is facing a first direction;
   receiving capture of a second image at the first location by a second capture device that is a separate device from the first capture device, wherein the image is captured when the second capture device is facing a second direction that is distinct from the first direction;
   determining a time when the first image at the first location and the second image at the first location were captured; and
   in response to determining that the first direction and the second direction both correspond to the same first location and both the first image and the second image correspond to a particular time:
      simultaneously generating for display, a first media asset associated with the first direction on the first capture device and distinct from first image and a second media asset associated with the second direction on the second capture device and distinct from the second image, wherein the first capture device is located in the same direction as the first direction at the time of the display and the second capture device is located in the same direction as the second direction at the time of the display and the first media asset and the second media asset are associated with the particular time.

2. The method of claim 1, further comprising:
   determining a plurality of media assets that are associated with the first and second direction to replicate the first location; and
   providing the media assets for user selection.

3. The method of claim 1, further comprising:
   use an accelerometer to obtain directional information; and
   using the obtained directional information to differentiate between the first direction and the second direction.

4. The method of claim 1, further comprising:
   determining that the first device is changing a facing direction; and
      in response to the detection, modifying the generated display on the first capture device by selecting media assets that correspond to the changed direction.

5. The method of claim 1, further comprising, generating a sound on the first media capture device, wherein the sound corresponds to a sound that is generated at the first location in a real-life setting.

6. The method of claim 1, further comprising, recommending a product on the first capture device that may be sold in a real-life setting at the first location.

7. The method of claim 1, wherein, the first media asset is captured by the first device on a same day as the first image at the first location.

8. The method of claim 1, further comprising, determining whether the first capture device is aimed at a higher or lower direction within the first direction.

9. The method of claim 8, further comprising, in response to determining that the first capture device is aimed at the higher direction, within the first direction, selecting a media asset that corresponds to the higher direction.

10. The method of claim 1, wherein the first image and the second image are captured by separate users associated with separate first and second capture devices.

11. The method of claim 1, further comprising, recording additional data associated with the capture of first image at the first location, wherein the additional data includes circumstances surrounding the capture of the first image at the first location.

12. A system comprising:
control circuitry configure to:
receive capture of a first image at a first location in the real world by a first capture device, wherein the image is captured when the first capture device is facing a first direction;
receive capture of a second image at the first location by a second capture device that is a separate device from the first capture device, wherein the image is captured when the second capture device is facing a second direction that is distinct from the first direction;
determine a time when the first image at the first location and the second image at the first location were captured; and
in response to determining that the first direction and the second direction both correspond to the same first location and both the first image and the second image correspond to a particular time:
simultaneously generate for display, a first media asset associated with the first direction on the first capture device and distinct from first image and a second media asset associated with the second direction on the second capture device and distinct from the second image, wherein the first capture device is located in the same direction as the first direction at the time of the display and the second capture device is located in the same direction as the second direction at the time of the display and the first media asset and the second media asset are associated with the particular time.

13. The system of claim 12, further comprising, the control circuitry configured to:
determine a plurality of media assets that are associated with the first and second direction to replicate the first location; and
provide the media assets for user selection.

14. The system of claim 12, further comprising, the control circuitry configured to:
use an accelerometer to obtain directional information; and
use the obtained directional information to differentiate between the first direction and the second direction.

15. The system of claim 12, further comprising, the control circuitry configured to:
determine that the first device is changing a facing direction; and
in response to the detection, modify the generated display on the first capture device by selecting media assets that correspond to the changed direction.

16. The system of claim 12, further comprising, the control circuitry configured to generate a sound on the first media capture device, wherein the sound corresponds to a sound that is generated at the first location in a real-life setting.

17. The system of claim 12, further comprising, the control circuitry configured to recommend a product on the first capture device that may be sold in a real-life setting at the first location.

18. The system of claim 12, wherein, the first media asset is captured by the first device on a same day as the first image at the first location.

19. The system of claim 12, wherein, the first media asset is selected by the control circuitry based on a season in which the first image was captured by the first device.

20. The system of claim 12, further comprising:
determining whether the first capture device is aimed at a higher or lower direction within the first direction; and
in response to determining that the first capture device is aimed at the higher direction, within the first direction, select a media asset that corresponds to the higher direction.

* * * * *